Figure 1:
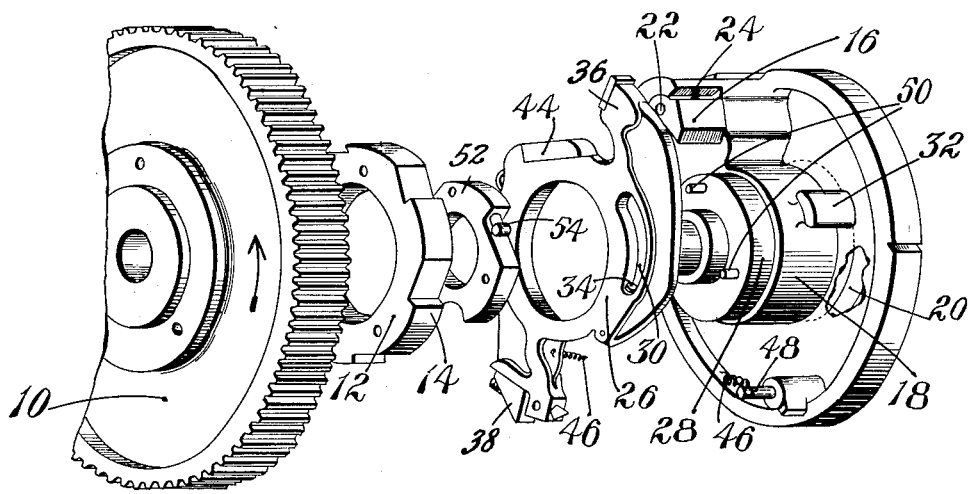

Dec. 1, 1931.  M. H. BALLARD ET AL  1,834,082

CLUTCH MECHANISM

Original Filed May 28, 1926

INVENTORS
Milton H. Ballard
Thomas H. Seely
By their Attorney,
Nelson W. Howard

Patented Dec. 1, 1931

1,834,082

UNITED STATES PATENT OFFICE

MILTON H. BALLARD, OF BEVERLY, AND THOMAS H. SEELY, OF MELROSE, MASSACHUSETTS, ASSIGNORS TO UNITED SHOE MACHINERY CORPORATION, OF PATERSON, NEW JERSEY, A CORPORATION OF NEW JERSEY

CLUTCH MECHANISM

Original application filed May 28, 1926, Serial No. 112,279. Divided and this application filed May 17, 1928. Serial No. 278,356.

This invention relates to clutch mechanisms and particularly to clutch mechanism organized to prevent the driven member from running ahead of the driving member.

The illustrated mechanism, as one practical application of the invention, may be embodied in a heel-seat forming machine such as is disclosed in our Letters Patent of the United States, No. 1,674,085, granted June 19, 1928, on an application of which this application is a division.

Objects of the invention are to provide an improved clutch mechanism which will operate with certainty and uniformity and in which undue noise, wear, and liability of breakage will be avoided.

In accordance with a feature of the invention, the illustrated embodiment of the invention comprises an improved construction including outer and inner rings secured respectively to driving and driven members, a main clutch located between the outer ring and the driven member for imparting rotation to the driven member in one direction, and a one-way clutch between the rings to prevent the driven member from going faster than the driving member. As illustrated, the main clutch is arranged to impart a half revolution at a time to the driven member, and the one-way clutch between the driven and driving members is a Horton clutch arranged to prevent over-running of the driven member with respect to the driving member in either half revolution.

This invention is of special utility in machines in which, as in machine of the type referred to, during the first half revolution of the driven member, powerful springs are compressed which react during the second half revolution to cause the driven member to become temporarily a driving member and cause it to run ahead of the normal driving member, with the result that the members which effect the disengagement of the clutch are violently brought together with objectionable shock, noise, and liability of breakage of parts. By our invention the one-way clutch acts immediately to connect the driven member, when it tends to run ahead of the driving member, to the driving member and hence tends to rotate the driving member faster in the direction in which it is running. The driving member and power shaft or motor with which it is connected thus absorb the energy of the reacting springs or the like and act as a brake on the overthrow of the driven member.

Another feature of the invention consists, in a clutch mechanism arranged to start and stop a machine every half revolution, of means for simultaneously adjusting both stopped positions and means for adjusting one of the stopped positions independently of the other.

Figure 2:
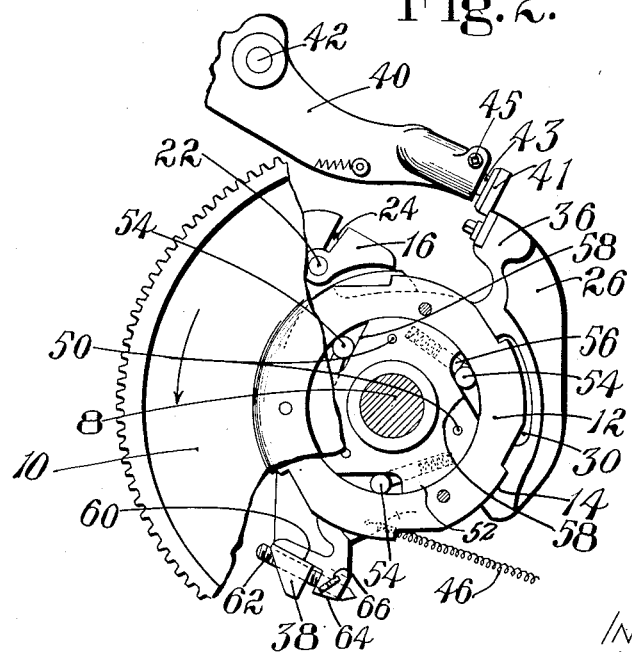

In the drawings,

Fig. 1 is an exploded view of a clutch mechanism embodying the present invention, and Fig. 2 is a view, partly in section, of the parts shown in Fig. 1.

The illustrated clutch mechanism for imparting half revolutions to a driven member and preventing overrunning of the driven member comprises a fixed shaft 8 on which is mounted for rotation a driving member 10 to which is fixed a ring 12 having teeth 14 on its outer periphery which cooperate with a pawl 16 on a driven member 18, also mounted on the shaft 8. On the driven member is an eccentric 20 or other means for imparting motion to the machine in which the mechanism is installed. The pawl 16 is pivoted at 22 to the driven member 18 and is urged toward the teeth 14 by a spring 24. A main clutch-controlling member 26 has a central opening by which it is mounted on a reduced portion 28 of the driven member 18 for rotation therewith and for partial rotation relatively thereto. To limit rotation of the member 26 relatively to the driven member 18, the member 26 is provided with a slot 30 which is engaged by a projection 32 on the driven member 18, and a spring plunger 34 is provided in the member 26 at one end of the slot 30 to lessen the shock of contact of the end of the slot with the projection 32. The clutch-controlling member 26 has two projections 36, 38, which are arranged about 180 degrees from each other and one or the other of which is normally in engagement with a stop lever 40 having a fixed pivot at 42. At the end of the lever 40 is a contact piece 41 having a stem 43 which is secured by a clamp screw 45 in the end of the lever for adjustment lengthwise of the lever. Adjustment of the contact piece 41 lengthwise of the lever varies the point at which the machine will stop when the projections 36, 38 engage it.

The member 26 carries a pawl-lifting cam piece 44 which, in the stopped position of the machine, engages the pawl 16 and holds it out of engagement with the teeth 14. At this time, of course, the stop lever 40 is in engagement with one of the projections 36, 38, as shown in Fig. 2. When the lever 40 is moved on its pivot 42 away from the projection 36, a spring 46 connected between the member 26 and a pin 48 on the driven member 18 acts to rotate the clutch-controlling member 26 in the direction of rotation of the driving member 10 and to cause the cam piece 44 to move away from engagement with the pawl 16, permitting the spring 24 to move the pawl into engagement with one of the teeth 14, whereupon rotation will be imparted to the driven member 18 by the driving member 10.

After the starting of the machine as described, the lever 40 is allowed to drop back to its normal position, as shown in Fig. 2, so that when, after half a revolution of the driven member, the projection 38 engages the lever 40, the cam piece 44 will be arrested and, as movement of the driven member 18 continues, the cam piece 44 will engage the pawl 16 and move it out of engagement with that one of the teeth 14 with which it happens to be in contact, thus disconnecting the driven member 18 from the driving member 10. Movement of the driven member 18 is thus arrested and the machine brought to a stop.

Should the driven member 18 tend to run ahead of the driving member when the machine is restarted, due to the reaction of heavy springs in the machine which have previously been compressed, or for any other reason, such movement is prevented by the following mechanism: Fixed to the driven member 18 by pins 50 is a ring 52 having, as shown, three notches in its outer periphery. The inner ring 52 fits inside the outer ring 12 and in each of the notches of the inner ring 52 is a roll 54 and a spring plunger 56 which engages the roll and tends to hold it pinched in the angle between one side 58 of the notch and the inner periphery of the outer ring 12. This construction constitutes a one-way roller clutch which permits rotation of the driving member in the direction of drive relatively to the driven member and prevents rotation of the driven member in the direction of drive relatively to the driving member. Consequently, if the driven member tends, for any reason, to rotate faster than the driving member, the one-way clutch acts to connect the driven member to the driving member and prevent rotation of the driven member relatively to the driving member in the direction of drive. Thus energy of the driven member tending to rotate it in the direction of drive is imparted to the driving member to cause it to rotate faster in the direction of the drive. The driving member thus acts as a brake or retarder to such rotation of the driven member and prevents objectionable clashing of the projections 36, 38 against the stop lever 40 and consequent wear and liability of breakage.

In order that the position at which the machine stops when the projection 38 engages the stop lever 40 may be varied, the projection 38 is made adjustable tangentially of its path of rotation. The projection 38 is formed as a block having sliding contact with a surface 60 on the member 26 and through the block 38 is threaded a screw 62 which is rotatably mounted in a projection 64 on the member 26. By rotating the screw the block 38 may be adjusted tangentially of its path of rotation to vary the point at which the machine stops when the block engages the stop lever 40. Accidental rotation of the screw is prevented by a cotter pin 66. Adjustment of the block 38 varies one of the stopped positions of the driven member 18 without affecting the other stopped position of the driven member, which is determined by adjustment of the contact piece 41 lengthwise of the lever 40. Of course, adjustment of the contact piece 41 varies both stopped positions but when this is adjusted properly for the stopped position when the projection 36 engages the stop lever, the block 38 may be adjusted to vary the stopped position when it engages the lever without affecting the other stopped position.

Having thus described our invention, what we claim as new and desire to secure by Letters Patent of the United States is:

1. In a clutch mechanism, the combination of a driving member, an outer ring secured to the driving member, a driven member, an inner ring secured to the driven member and located inside said outer ring, a one-way clutch between the adjacent surfaces of said rings to prevent rotation of the driven ring relatively to the driving ring in the direction of drive, a one-way clutch between the driven member and the outer ring to cause rotation of the driven member by the driving member, and means for operating said clutch to connect the driven member to and disconnect it from the driving member.

2. In a clutch mechanism, the combination of a driving member, an outer ring secured to the driving member, said ring having outer peripheral teeth and a smooth inner surface, a driven member, an inner ring secured to the driven member, said ring being located inside the outer ring and having notches on its outer periphery, roll clutch elements located in the notches of the inner ring and adapted to engage the outer ring to prevent relative rotation of the rings in one direction, a pawl on the driven member arranged to engage the teeth of the outer ring, the pawl and teeth being disposed so as to prevent relative rotation of the driving and driven members in the other direction, and means for operating the pawl to control movement of the driven member by the driving member.

3. In a clutch mechanism, the combination of a driving member, an outer ring secured to the driving member, said ring having outer peripheral teeth and a smooth inner surface, a driven member, an inner ring secured to the driven member and located inside the outer ring, clutch elements located between the inner surface of the outer ring and the outer surface of the inner ring to prevent rotation of the inner ring relatively to the outer ring in the direction of drive, a pawl on the driven member arranged to engage the teeth on the outer ring to effect rotation of the driven member with the outer ring, and pawl lifting means for disengaging the pawl from the outer ring to permit rotation of the outer ring relatively to the driven member in the direction of drive.

4. In a clutch mechanism, the combination of a driving member, a driven member, a clutch for causing a half revolution at a time to be imparted to the driven member by the driving member, means for varying both of the stopped positions of the driven member, and separate means for varying one of the stopped positions of the driven member without affecting the other stopped position.

5. In a clutch mechanism, the combination of a driving member, a driven member, a clutch, a stop arm, a clutch controller having two stop projections for engaging the stop arm in turn to cause a half revolution at a time to be imparted to the driven member by the driving member, means on the stop arm for varying the stopped positions of the driven member, and separate means on the controller for varying one of the stopped positions of the driven member without affecting the other stopped position.

6. In a clutch mechanism, the combination of a driving member having a portion comprising an outer ring with a toothed periphery, a driven member, a pawl on the driven member arranged to engage the teeth of the outer ring to effect rotation of the driven member by the driving member, a pawl-lifting cam arranged on the driven member for rotation therewith and for partial rotation relatively thereto, a stop lever for arresting rotation of the pawl-lifting cam to cause the pawl to be lifted, a spring for rotating the cam relatively to the driven member when the cam is released by the stop lever, an inner ring on the driven member located in the outer ring, and clutch elements between the inner ring and the inner surface of the outer ring to prevent rotation of the driven member relatively to the driving member in the direction of drive.

In testimony whereof we have signed our names to this specification.

MILTON H. BALLARD.
THOMAS H. SEELY.